United States Patent [19]

Ohya et al.

[11] 4,206,292
[45] Jun. 3, 1980

[54] VINYL CHLORIDE RESIN COMPOSITION CONTAINING POLYMERIC PROCESSING AID

[75] Inventors: Masaki Ohya; Yo Iizuka; Susumu Midorikawa, all of Iwaki, Japan

[73] Assignee: Kureha Kagaku Kogyo Kabushiki Kaisha, Tokyo, Japan

[21] Appl. No.: 18,321

[22] Filed: Mar. 7, 1979

[30] Foreign Application Priority Data

Mar. 9, 1978 [JP] Japan .................. 53-26781
Mar. 23, 1978 [JP] Japan .................. 53-33318
Oct. 13, 1978 [JP] Japan .................. 53-125966

[51] Int. Cl.$^2$ .............. C08L 33/12; C08L 33/10; C08L 33/08
[52] U.S. Cl. ..................... 525/225; 525/85; 525/213
[58] Field of Search ............ 260/899, 876 R

[56] References Cited

U.S. PATENT DOCUMENTS

| | | | |
|---|---|---|---|
| 2,897,169 | 7/1959 | Dazzi | 260/31.4 |
| 3,055,859 | 9/1962 | Vollmert | 260/899 |
| 3,373,229 | 3/1968 | Philpot et al. | 260/899 |
| 3,475,361 | 10/1969 | Garner | 260/23 |
| 3,655,825 | 4/1972 | Souder et al. | 260/876 R |
| 3,814,740 | 6/1974 | Miller | 260/86.1 E |
| 3,867,481 | 2/1975 | Whang | 260/899 |
| 4,121,016 | 10/1978 | Garrison | 260/899 |

Primary Examiner—Carman J. Seccuro
Attorney, Agent, or Firm—Wenderoth, Lind & Ponack

[57] ABSTRACT

A vinyl chloride resin composition having surface smoothness comprises:
(1) 100 parts of vinyl chloride polymer; and
(2) 0.1 to 30 parts of a polymer processing aid comprising:
(A) 10 to 100 parts of a copolymer comprising 20 to 99% of an alkyl methacrylate, 1 to 70% of a dialkyl itaconate, and 0 to 60% of a monomer copolymerizable therewith; and
(B) 0 to 90 parts of a copolymer comprising 80 to 100% of an alkyl methacrylate, and 0 to 20% of a monomer copolymerizable therewith, the sum of the quantities of the copolymers (A) and (B) producing 100 parts of the polymer processing aid, all quantities expressed in parts and percentages being by weight.

This vinyl chloride resin composition comprising a novel polymer processing aid not only shows an increased gelation rate, yields less ungelled particles and possesses excellent processability such as an increased elongation at a high temperature, but particularly affords a formed product of notably improved surface smoothness.

8 Claims, 3 Drawing Figures

VINYL CHLORIDE RESIN COMPOSITION CONTAINING POLYMERIC PROCESSING AID

BACKGROUND OF THE INVENTION

The present invention relates to a vinyl chloride resin composition possessing improved transparency, processability and surface smoothness.

While vinyl chloride polymers are widely used because of their excellent physical and chemical properties, there remain various disadvantageous problems in their processability, such as a narrow range of processing temperatures at which forming or molding can be carried out due to only a small difference between the processing temperatures and thermal decomposition temperature of the polymer, and also a slow rate of gelation. It is well known that such drawbacks can be eliminated to some extent by the addition of a plasticizer. However, the addition of a plasticizer not only gives rise to other problems such as evaporation or migration of the plasticizer, but also deteriorates the mechanical properties of formed polymer products.

On the other hand, in order to obtain improved processability so that the formed products of the polymer will have a smooth surface, the rate of gelation will be increased, and deep drawing will be successfully carried out, there have been some attempts to add to a vinyl chloride polymer, as a polymer processing aid, a copolymer having compatibility therewith, such as a copolymer of styrene and acrylonitrile, a copolymer predominantly comprising methyl methacrylate and styrene, or a copolymer predominantly comprising methyl methyacrylate and an alkyl acrylate.

However, all these prior art methods for improving the processability of vinyl chloride polymers have serious drawbacks as follows.

A copolymer of styrene and acrylonitrile impairs the thermal stability of the polymer, and does not significantly improve its processability such as the gelation rate and deep drawing properties.

In comparison with the copolymer of this type, some copolymers predominantly comprising methyl methacrylate and styrene and some copolymers predominantly comprising methyl methacrylate and an alkyl acrylate effectively accelerate the gelation rate and also increase the elongation at a high temperature, whereby satisfactory deep drawing properties can be obtained, and adaptability for fabrication, for example, vacuum forming, is markedly improved. However, ungelled particles (fish eyes) often appear, and the effectiveness in improving the surface smoothness of the formed products such as extruded films is inadequate.

As set forth above, it was difficult with any known polymer processing aids to obtain formed products having highly satisfactory surface smoothness and simultaneously to minimize ungelled particles therein.

According to the knowledge heretofore acquired in the art, it is considered necessary to increase the degree of polymerization of a polymer processing air in order to obtain a formed product having improved surface smoothness on the one hand, and to lower the degree of polymerization of such an aid in order to reduce ungelled particles in a formed product on the other hand. Thus, a method that fully meets these two requirements at the same time has not yet been developed as far as we are aware.

SUMMARY OF THE INVENTION

As a result of our extensive research on the composition and structure of polymer processing aids to obtain vinyl chloride resin compositions which have transparency and high processability and are free of the shortcomings described above, it has been found that a resin composition of excellent properties can be obtained by adding a vinyl chloride polymer a polymer processing aid comprising: (A) 10–100 parts of a copolymer comprising 20–99% of an alkyl methacrylate, 1–70% of a dialkyl itaconate, and 0–60% of a monomer copolymerizable therewith; and (B) 0–90 parts of a copolymer comprising 80–100% of an alkyl methacrylate and 0–20% of a monomer copolymerizable therewith, the sum of the quantities of the copolymers (A) and (B) producing 100 parts of the polymer processing aid, all quantities in percentages and parts set forth above and elsewhere herein being by weight.

We have arrived at the present invention on the basis of our discovery that a polymer processing aid comprising a copolymer of an alkyl methacrylate and a dialkyl itaconate as set forth above not only accelerates the gelation rate leaving substantially no ungelled particles and imparts to a resin composition excellent processability such as an increased elongation at a high temperature, but also notably improves the surface smoothness of the resulting formed products.

BRIEF DESCRIPTION OF THE ILLUSTRATIONS

In the illustrations:

FIGS. 1, 2, and 3 are photomicrographs (X 40) each showing the surface of a formed product (filament of vinyl chloride resin) to be used for evaluation of the surface smoothness of a product formed from the composition according to the present invention.

DETAILED DESCRIPTION OF THE INVENTION

Figure 1:

The polymer processing aid used in the present invention comprises (A) 10 to 100 parts of a copolymer comprising 20 to 99% of an alkyl methacrylate, 1 to 70% of a dialkyl itaconate, and 0 to 60% of one or more monomers copolymerizable therewith, and (B) 0 to 90 parts of a copolymer comprising 80 to 100% of an alkyl methacrylate and 0 to 20% of one or more monomers copolymerizable therewith. Among these, a polymer processing aid comprising 10 to 90 parts of the copolymer (A) and 90 to 10 parts of the copolymer (B) is most preferable.

All ratios herein specified refer to the ratios between the contents of the respective components of the composition, polymer processing aid or copolymer. However, since the degree of polymerization of each polymer is ordinarily 95% or higher, the above ratios can be regarded as substantially identical with the ratios between the monomers charged.

The polymer processing aid comprising the copolymers (A) and (B) is preferably prepared by wetblending both of the copolymers because mixing of the two copolymers in powder form will result in lower processability and transparency of the composition obtained.

The wet-blending may be conducted either by blending the copolymers (A) and (B) in the latex form, or by adding and polymerizing the constituent monomers of one of the copolymers in the presence of the other copolymer. In the latter case, the constituent monomers of the copolymer (B) may be added to and polymerized with the copolymer (A) or vice versa. Of these blending methods including the latex blending, a particularly preferable method comprises adding 90 to 10 parts of the monomers which will constitute the copolymer (A) to 10 to 90 parts of the copolymer (B), and subjecting the same to polymerization. This method, as compared with the other methods, particularly effectively prevents occurrence of ungelled particles, and further ensures improved surface smoothness and transparency.

The term "addition and polymerization," or "polymerization of monomers in the presence of a copolymer" is herein used in a broader sense than "graft polymerization," and all of the monomers to be charged in the second-stage polymerization, which is carried out after the first-stage polymerization, need not necessarily be grafted on the copolymer obtained in the first stage, but part of the monomers may be polymerized in ungrafted state to give a polyblend.

Relative to 10 to 100 parts of the copolymer (A), 0 to 90 parts of the copolymer (B) is used in accordance with the present invention. The use of the copolymer (B) in larger amounts is undesirable because many ungelled particles occur.

The copolymer (A) comprises 20 to 99%, preferably 20 to 80%, and more preferably 20 to 60%, of an alkyl methacrylate; 1 to 70%, preferably 1 to 60%, and more preferably 10 to 60%, of a dialkyl itaconate; and 0 to 60%, preferably 0 to 20%, of one or more monomers copolymerizable therewith. If a dialkyl itaconate is used in smaller amounts, the polymer processing aid obtained will not be uniformly dispersed in a vinyl chloride polymer under ordinary processing conditions, and there remain numerous ungelled particles. While occurrence of ungelled particles can be prevented by lowering the degree of polymerization of a polymer processing aid to increase the melt-fluidity thereof, the effect of improving the processability of vinyl chloride polymers will be sacrificed. Conversely, a dialkyl itaconate in excess of the amount specified above lowers the transparency of the resulting vinyl chloride resin composition.

For an alkyl methacrylate which is one of the constituents of the copolymer (A), an alkyl methacrylate having 1 to 8, preferably 1 to 4 carbon atoms in the alkyl group is used, and methyl methacrylate is particularly preferred.

For a dialkyl itaconate which is another constituent of the copolymer (A), a dialkyl itaconate having 1 to 18, preferably 1 to 10 carbon atoms in the alkyl group is used, and diethyl itaconate and dibutyl itaconate are especially suitable.

The most distinguishing feature of the present invention is that the polymer used as a processing aid comprises a copolymer predominantly comprising a dialkyl itaconate and an alkyl methacrylate, and because of this feature, the above described excellent processability can be obtained. The processability can be further controlled to a slight extent by copolymerizing with the copolymer a monomer copolymerizable with the aforesaid monomers.

Examples of monomers copolymerizable with the alkyl methacrylate and dialkyl itaconate are aromatic vinyl compounds such as styrene, α-methyl styrene, and chlorostyrene; alkyl acrylates such as methyl acrylate, ethyl acrylate, butyl acrylate, and 2-ethylhexyl acrylate; unsaturated nitriles such as acrylonitrile, and methacrylonitrile; vinyl ethers such as methyl vinyl ether, and ethyl vinyl ether; vinyl ketones such as methyl vinyl ketone, and ethyl vinyl ketone; and vinyl esters such as vinyl acetate. One or more of these third component monomers can be used in a quantity which will not impair the performance of the polymer processing aid, i.e., within a range of 0 to 60%.

It is preferable in most cases that the third component monomers which can be used in combination with the methyl methacrylate and dialkyl itaconate be used in a quantity as small as 0 to 20%, but in some cases it is preferable that the third component be intentionally added to further impart to the vinyl chloride resin compositions certain desirable properties without impairing the advantageous features of the polymer processing aid of the present invention, whereby a product of improved surface smoothness and fewer ungelled particles can be obtained.

Among the monomers for use as the third component, alkyl acrylates are particularly preferable for the following reasons.

If an alkyl acrylate is added to the constituent monomers of the copolymer (A), the glass transition temperature (Tg) of the copolymer (A) is lowered whereby handling conditions, such as ease of granulation and drying, after the precipitation of the copolymer in the latex form with a salt or an acid are improved in the preparation of the polymer processing aid, and also sticking of the resin composition to the surfaces of rolls can be prevented during calendering.

In general, the greater the amount of the alkyl acrylate used, the more remarkable will the advantageous effects be. However, an excess amount of an alkyl acrylate results in poor performance of the polymer processing aid, and hence 20 to 60%, preferably 20 to 50%, of an alkyl acrylate is employed.

Particularly suitable alkyl acrylates are ethyl acrylate and butyl acrylate.

The copolymer (B) comprises 80 to 100%, preferably 90 to 100%, of an alkyl methacrylate; and 0 to 20%, preferably 0 to 10%, of one or more monomers copolymerizable with the alkyl methacrylate, and the same alkyl methacrylate as is used for the copolymer (A) is similarly used. The addition of a smaller quantity of the alkyl methacrylate to the copolymer (B) is undesirable because the effect of improving the processability of the resin composition becomes poor.

Examples of monomers copolymerizable with the alkyl methacrylate are alkyl acrylates such as methyl acrylate, ethyl acrylate, n-butyl acrylate, and 2-ethylhexyl acrylate; aromatic vinyl compounds such as styrene, α-methyl styrene, and chlorostyrene; unsaturated nitriles such as acrylonitrile, and methacrylonitrile; vinyl ethers such as methyl vinyl ether, and ethyl vinyl ether; vinyl ketones such as methyl vinyl ketone, and ethyl vinyl ketone; and vinyl esters such as vinyl acetate.

The polymer processing aid of the present invention can be prepared by a known process and it is desirable for the polymer processing aid to have a relatively high degree of polymerization when blended with a vinyl chloride polymer. It is advantageous that the degree of polymerization, which should generally be determined in relation to the composition and degree of polymerization of the vinyl chloride polymer, be such that the reduced viscosity is at least 0.1 dl/g, preferably at least 0.5 dl/g, measured at 20° C. with a solution of 0.4 g of a polymer processing aid in 100 cc of chloroform.

The vinyl chloride polymers to be blended with the polymer processing aid according to the present invention include: polyvinyl chloride; a copolymer of at least 80% of vinyl chloride and one or more of monomers copolymerizable therewith, such as vinylidene chloride, vinyl acetate, acrylic ester, acrylonitrile, ethylene, and propylene; derivatives of the polyvinyl chloride and the copolymer, such as resins obtained by further chlorination of the above mentioned polymers; or a mixture of two or more polymers selected from the above groups.

The polymer processing aid of this invention is added in a quantity of 0.1 to 30 parts, preferably 0.5 to 10 parts, for 100 parts of a vinyl chloride polymer. If this aid is added in a smaller quantity, the effect of improving the processability of the polymer becomes poor, while greater quantities of this aid deteriorates the innate properties of the vinyl chloride polymer.

If desired, the resin composition of the present invention may comprise, in addition to the aforesaid vinyl chloride polymer and polymer processing aid, optional additives such as stabilizers, antioxidants, ultraviolet ray absorbents, lubricants, impact modifiers, plasticizers, coloring agents, fillers, and blowing agents in conventional quantities.

In order to indicate more fully the nature and utility of this invention, the following specific examples of practice constituting preferred embodiments of the invention and comparison examples are set forth, it being understood that these examples are presented as illustrative only and not intended to limit the scope of the invention. Throughout these examples, quantities expressed in "parts" are "parts by weight".

EXAMPLE 1

300 parts of distilled water, 1.0 part of sodium dodecylbenzenesulfonate which had been dissolved in water, 0.03 part of potassium persulfate, 0.0075 part of sodium hydrogensulfite, 75 parts of methyl methacrylate, and 0.015 part of n-dodecyl mercaptan were charged into a reactor provided with a stirrer. The atmosphere within the reactor was purged with nitrogen, and then the temperature in the reactor was raised to 50° C. with stirring. The mixture obtained was subjected to a reaction at this temperature for 6 hours. Thereafter, 0.01 part of potassium persulfate, 0.0025 part of sodium hydrogensulfite, 12.5 parts of methyl methacrylate, and dibutyl itaconate were added, and the resulting mixture was subjected to a reaction at 50° C. for 15 hours. After cooling of the reaction mixture, the latex obtained was subjected to precipitation with aluminium sulfate, and subsequently neutralized, filtered, washed with water, and dried, whereupon a polymer (Polymer Processing Aid No. 1) was obtained. The conversion was 99.1%.

3 parts of this polymer was blended with 100 parts of polyvinyl chloride (average degree of polymerization: 700), 2 parts of a dioctyltinmercapto compound, 0.8 part of stearyl alcohol, and 0.2 part of a montanate. The resulting composition was subjected to forming, and then tested for the properties shown in Table 1. The results obtained are summarized in Table 3.

EXAMPLE 2

Polymer processing aids each having the composition and reduced viscosity shown in Table 2 (Polymer Processing Aids Nos. 2–5) were tested for the properties set forth in Table 1 in the same manner as in Example 1, whereupon the results shown in Table 3 were obtained. The degree of polymerization of these polymer processing aids except No. 3 had been suitably controlled by adding n-dodecyl mercaptan at the first-stage polymerization. In both the first- and second-stage polymerizations in all Examples, including this Example, and Comparison Examples, 0.04 part of potassium persulfate and 0.01 part of sodium hydrogensulfite were used as redox initiators for a total of 100 parts of the monomers.

EXAMPLE 3

A polymer processing aid was prepared under the same conditions as those employed to obtain Polymer Processing Aid No. 2 except that the first- and second-stage polymerizations were carried out in reverse order as shown in Table 2. The polymer processing aid thus obtained was tested in the same manner as in the preceding Examples. The results obtained are shown in Table 3 (Polymer Processing Aid No. 6).

EXAMPLE 4

A composition comprising 300 parts of water, 1 part of sodium dodecylbenzenesulfonate, 0.12 part of potassium persulfate, 0.03 part of sodium hydrogensulfite, 50 parts of methyl methacrylate, and 50 parts of dibutyl itaconate was subjected to polymerization at 50° C. for 15 hours to obtain a polymer latex (A).

Separately, a composition comprising 300 parts of water, 1 part of sodium dodecylbenzenesulfonate, 0.04 part of potassium persulfate, 0.01 part of sodium hydrogensulfite, 100 parts of methyl methacrylate, and 0.03 part of n-dodecyl mercaptan was subjected to polymerization at 50° C. for 15 hours to obtain a polymer latex (B).

The polymer latexes (A) and (B), after being thoroughly mixed with each other, were subjected to a post-treatment under the same conditions as in Example 1 to obtain a polymer (Polymer Processing Aid No. 7). This polymer was tested for the properties set forth in Table 1 under the same conditions as in Example 1. The results obtained are set forth in Table 3.

EXAMPLE 5

Tests were conducted in exactly the same manner as in Example 1 except that the composition of the polymer obtained in the first-stage polymerization was modified as shown in Table 2. The results are summarized in Table 3 (Polymer Processing Aid No. 8).

Table 1

Transparency

Each polymer composition was kneaded for 3 min. with rolls having a surface temperature of 160° C., and pressed for 3 min. at 200° C. to prepare a polymer sheet sample of 3 mm thickness. The parallel ray transmittance and haze of this sheet sample were measured by means of a hazeometer of integrating sphere type with C-filter in accordance with JIS K-6714.

Surface Smoothness

Figure 2:
Figure 3:
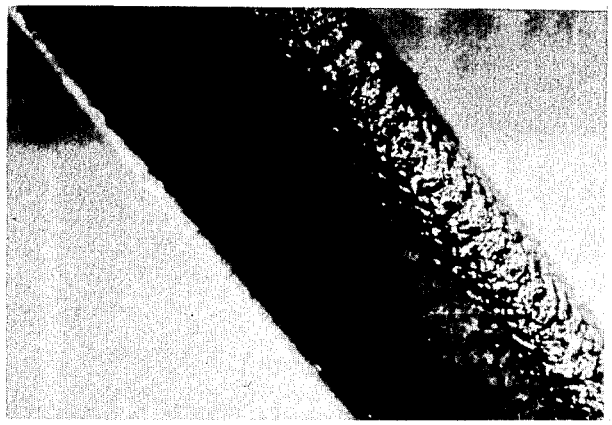

Each polymer composition was kneaded for 3 min. with rolls having a surface temperature of 160° C., and formed into a filament through a Koka-type flow tester. The surface smoothness of this filament was evaluated upon magnifying the surface thereof 40 times with an optical microscope. For the evaluation, the filament surface was graduated into five grades: A, B, C, D and E. The photomicrographs of the filament surfaces used as the evaluation standard are shown in the illustrations. Only the surfaces rated A, C and E are shown in the illustrations (FIG. 1 ... A, FIG. 2 ... C, and FIG. 3 ... E), and those rated B and D fall therebetween.

Filament Preparation Conditions

Nozzle: 1.0 mm$\phi$ × 10 mm
Load: 150 kg/cm$^2$
Temperature: 200° C.
Preheating: 4 min.
Sample: 1.5 g

Strength & Elongation at High Temperature

Each polymer composition was kneaded for 3 min. with rolls having a surface temperature of 160° C., and pressed for 3 min. at 200° C. to prepare a polymer sheet sample of 1.0 mm thickness. This sheet sample was cut into strips from which specimens formed into JIS-No. 1 dumbbell shape were prepared through a plain cutter. The strength and elongation of each dumbbell specimen was measured by means of Tensilon UTM-L (mfd. by Toyo Sokki K.K., Japan).

Measurement Conditions

Temperature: 150° C.
Sample length: 40 mm
Pulling rate: 500 mm/min.

Ungelled Particle

Each polymer composition was extruded through a T-die of a 20 mm$\phi$-extruder into a sheet of 25 mm width and 0.5 mm thickness. This sheet was stretched with a stretching ratio of ca. 13 to form a sheet of 10 mm width and 0.1 mm thickness. The number of ungelled particles per meter of the sheet thus obtained was counted. The extruder temperature was controlled as follows:
$C_1 = 80°$ C.
$C_2 = 150°$ C.
$C_3 = 180°$ C.
Die = 190° C.

Table 2

| Polymer Processing Aid No. | | Composition of Polymer Processing Aid | | | | | | | | | | Type of Polymer Processing Aid* | Reduced Viscosity $\eta SP/C$** (20° C.) |
|---|---|---|---|---|---|---|---|---|---|---|---|---|---|
| | | Copolymer (A) | | | | | Copolymer (B) | | | | | | |
| | | MMA | DBI | DEI | DMI | ST | nDM | MMA | ST | EA | BA | nDM | | |
| Present In vention | 1 | 12.5 | 12.5 | | | | | 75 | | | | 0.015 | (B)↔(A) | 7.98 |
| | 2 | 25 | 25 | | | | | 50 | | | | 0.015 | " | 5.53 |
| | 3 | 25 | 25 | | | | | 50 | | | | | " | 32.43 |
| | 4 | 25 | | 25 | | | | 50 | | | | 0.015 | " | 4.67 |
| | 5 | 25 | | | 25 | | | 50 | | | | 0.015 | " | 5.41 |
| | 6 | 25 | 25 | | | | | 50 | | | | 0.015 | (A)↔(B) | 8.61 |
| | 7 | 50 | 50 | | | | | 100 | | | | 0.03 | (A) + (B) | 7.23 |
| | 8 | 35 | 15 | | | ST | 0.05 | 45 | 5 | | | 0.015 | (B)↔(A) | 3.20 |
| Comparison Example | a | | | | | | | 100 | | | | 1 | (B) | 0.75 |
| | b | | | | | | | 90 | 10 | | | 0.07 | " | 2.76 |
| | c | | | | | | | 90 | | 10 | | 0.03 | " | 6.54 |
| | d | | | | | | | 90 | | | 10 | 0.03 | " | 6.88 |
| | e | | 45 | | | 55 | | | | | | | (A) | 3.56 |
| | f | 50 | | | | | 0.03 | 50 | | | | 3 | (A)↔(B) | 1.65 |
| | g | 50 | | | | | 0.03 | 25 | 25 | | | 1.5 | " | 4.63 |
| | h | 50 | | | | | 0.015 | | 28 | | 22 | 0.01 | " | 7.16 |
| | i | 50 | | | | | 0.015 | 30 | | 20 | | 0.01 | " | 6.57 |
| | j | 50 | | | | | 0.015 | 30 | | | 20 | 0.01 | " | 6.33 |
| | k | Commercially available polymer processing aid (MMA-EA copolymer) | | | | | | | | | | | | 3.37 |
| | l | Commercially available polymer processing aid (MMA-acrylate copolymer) | | | | | | | | | | | | 3.72 |
| | m | Commercially available polymer processing aid (MMA-styrene-acrylate-copolymer) | | | | | | | | | | | | 2.55 |
| | n | Commercially available polymer processing aid (MMA copolymer) | | | | | | | | | | | | 2.11 |
| | | Commercially available polymer processing aid (MMA-acrylate:acrylonitrile copolymer) | | | | | | | | | | | | — |

Note:
MMA : Methyl methacrylate
ST : Styrene
EA : Ethyl acrylate
BA : Butyl acrylate
DBI : Dibutyl Itaconate
DEI : Diethyl itaconate
DMI : Dimethyl itaconate
nDM : n-Dodecyl mercaptan
*(A)↔(B): Polymer obtained by adding constituent monomers of copolymer (B) to copolymer (A).
(B)↔(A) : Polymer obtained by adding constituent monomers of copolymer (A) to copolymer (B).
(A) + (B) : Latex blend of copolymer (A) and copolymer (B).
** :$\eta SP/C$ of 100 cc chloroform solution containing 0.4 g polymer processing aid dissolved therein.

Table 3

| Polymer Processing Aid No. | | Transparency | | | Strength & Elongation at High Temperature | | Ungelled Particle (Number/m) |
|---|---|---|---|---|---|---|---|
| | | Parallel Ray Transmittance (%) | Haze (%) | Surface Smoothness | Breaking Strength (kg/cm²) | Elongation at Breakage (%) | |
| Present Invention | 1 | 80.5 | 5.9 | A | 7.6 | 194 | 11 |
| | 2 | 83.5 | 2.3 | A | 7.5 | 174 | 8 |
| | 3 | 75.4 | 8.1 | A | 7.6 | 184 | 6 |
| | 4 | 82.5 | 5.2 | A | 7.5 | 174 | 9 |
| | 5 | 81.5 | 5.8 | A | 7.5 | 176 | 25 |
| | 6 | 77.4 | 6.2 | A | 7.7 | 186 | 25 |
| | 7 | 77.9 | 6.7 | B | 7.6 | 176 | 16 |
| | 8 | 84.5 | 2.9 | A | 7.6 | 179 | 29 |
| Comparison Example | a | 76.7 | 16.7 | D | 6.5 | 166 | >150 |
| | b | 74.0 | 15.3 | B | 6.9 | 184 | >150 |
| | c | 81.5 | 6.3 | B | 7.0 | 190 | 40 |
| | d | 82.0 | 5.0 | B | 7.1 | 186 | 50~100 |
| | e | 83.2 | 4.9 | E | 6.5 | 129 | 18 |
| | f | 84.2 | 3.8 | B | 7.5 | 176 | >150 |
| | g | 84.7 | 3.2 | B | 7.6 | 174 | 50~100 |
| | h | 81.0 | 3.3 | B | 7.5 | 170 | 50~100 |
| | i | 81.0 | 4.7 | B | 7.5 | 179 | 50~100 |
| | j | 80.5 | 4.7 | B | 7.4 | 178 | 50~100 |
| | k | 80.0 | 6.0 | B | 7.5 | 173 | >150 |
| | l | 80.5 | 4.3 | B | 7.4 | 190 | >150 |
| | m | 82.1 | 4.1 | B | 7.3 | 161 | 50~100 |
| | n | 81.1 | 7.3 | B | 7.3 | 183 | 36 |
| | o | 78.6 | 10.7 | B | 7.4 | 171 | >150 |
| | None | 81.9 | 4.0 | E | 7.1 | 140 | 23 |

COMPARISON EXAMPLE 1

Polymerization was carried out under conditions similar to those employed in Example 1 to prepare polymer processing aids (Polymer Processing Aids a through j) respectively having the compositions and reduced viscosities shown in Table 2. The tests set forth in Table 1 were conducted under the same conditions as in Example 1, and the results shown in the above Table 3 were obtained.

The first-stage polymerization for Polymer Processing Aids a through e was carried out for 15 hours, and an initiator was used particularly for Polymer Processing Aid e in a quantity 3 times that of the initiators for the other reactions.

The data on Polymer Processing Aids k through o were obtained from commercially available polymer processing aids.

EXAMPLE 6

300 parts of distilled water, 1.0 part of sodium dodecylbenzenesulfonate which had been dissolved in water, 0.03 part of potassium persulfate, 0.0075 part of sodium hydrogensulfite, 75 parts of methyl methacrylate, and 0.045 part of n-dodecyl mercaptan were charged into a reactor provided with a stirrer. The atmosphere within the reactor was purged with nitrogen, and then the temperature in the reactor was raised to 50° C. with stirring. The resultant mixture was subjected to a reaction at this temperature for 6 hours. Subsequently, 0.01 part of potassium persulfate, 0.0025 part of sodium hydrogensulfite, 12.5 parts of methyl methacrylate, 12.5 parts of dibutyl itaconate, and 0.0025 part of n-dodecyl mercaptan were added, and the mixture obtained was subjected to a reaction at 50° C. for 15 hours. After cooling of the reaction mixture, the latex obtained was subjected to precipitation with aluminium sulfate, and thereafter neutralized, filtered, washed with water, and dried, whereupon a polymer processing aid (No. 9) was obtained. The conversion was 99.0%.

This polymer processing aid was tested for the transparency and strength and elongation at a high temperature set forth in Table 1, and the roll tackiness explained in Table 4. The results obtained are shown in Table 6.

EXAMPLE 7

Instead of the sample of Example 6, polymer processing aids (Nos. 10 through 20 and 22) each having the composition and reduced viscosity listed in Table 5 were prepared by polymerization. These polymer processing aids were similarly tested as in Example 6, and the results set forth in Table 6 were obtained.

EXAMPLE 8

A composition comprising 300 parts of water, 1.0 part of sodium dodecylbenzenesulfonate, 0.04 part of potassium persulfate, 0.01 part of sodium hydrogensulfite, 50 parts of methyl methacrylate, 30 parts of dibutyl itaconate, 20 parts of butyl acrylate, and 0.01 part of n-dodecyl mercaptan was subjected to polymerization at 50° C. for 15 hours to obtain a polymer latex (A).

Separately, a composition comprising 300 parts of water, 1.0 part of sodium dodecylbenzenesulfonate, 0.04 part of potassium persulfate, 0.01 part of sodium hydrogensulfite, 100 parts of methyl methacrylate, 0.06 part of n-dodecyl mercaptan was subjected to polymerization at 50° C. for 15 hours to obtain a polymer latex (B).

The polymer latexes (A) and (B), after being thoroughly mixed with each other, were subjected to a post-treatment under the same conditions as in Example 6 to obtain a polymer processing aid (No. 21). This polymer processing aid was tested similarly as in Example 6, and the results shown in Table 6 were obtained.

TABLE 4

Roll Tackiness 5 g of a sample was continuously kneaded with small-sized rolls, and the time until a rolled sheet would not peel off the surface of the roll (roll sticking time) was measured to evaluate the roll tackiness.

Measurement Conditions

Surface temperature of the front roll—200° C.
Surface temperature of the rear roll—190° C.
Clearance—0.1 mm
Rotational speed—16 rpm
Sample cut—3 cuts/min.
During kneading, the sample was sticking exclusively to the front roll.

Table 5

| Polymer Processing Aid No. | Composition of Polymer Processing Aid | | | | | | | | | Type of* Polymer Processing Aid | $\eta sp/c$** |
|---|---|---|---|---|---|---|---|---|---|---|---|
| | Copolymer (A) | | | | | | | Copolymer (B) | | | |
| | MMA | DBI | DEI | BA | EA | St | nDM | MMA | nDM | | |
| Present Invention 9 | 12.5 | 12.5 | | | | | | 75 | 0.045 | (B) ← (A) | 3.13 |
| 10 | 12.5 | 7.5 | | 5.0 | | | 0.0025 | 75 | 0.045 | " | 3.08 |
| 11 | 10.0 | 6.0 | | 9.0 | | | 0.0025 | 75 | 0.045 | " | 3.24 |
| 12 | 7.5 | 4.5 | | 13.0 | | | 0.0025 | 75 | 0.045 | " | 3.58 |
| 13 | 15.0 | 2.5 | | 7.5 | | | 0.0025 | 75 | 0.045 | " | 3.47 |
| 14 | 25.0 | 15.0 | | 10.0 | | | 0.005 | 50 | 0.03 | " | 3.21 |
| 15 | 12.5 | 7.5 | | | 5.0 | | 0.0025 | 75 | 0.045 | " | 3.10 |
| 16 | 12.5 | | 7.5 | 5.0 | | | 0.0025 | 75 | 0.045 | " | 3.12 |
| 17 | 10.0 | 5.0 | | 5.0 | | 5.0 | 0.0025 | 75 | 0.045 | " | 3.02 |
| 18 | 5.0 | 3.0 | | 5.0 | | 12.0 | 0.0025 | 75 | 0.045 | " | 3.49 |
| 19 | 6.0 | 5.0 | | 7.0 | | 7.0 | 0.0025 | 75 | 0.045 | " | 3.06 |
| 20 | 10.0 | 5.0 | | | 5.0 | 5.0 | 0.0025 | 75 | 0.045 | " | 3.14 |
| 21 | 50.0 | 30.0 | | 20.0 | | | 0.01 | 100 | 0.06 | (A) + (B) | 2.97 |
| 22 | 12.5 | 7.5 | | | | 5.0 | 0.0025 | 75 | 0.045 | (B) ← (A) | 2.99 |

*Same as in Table 2
**Same as in Table 2

Table 6

| | Properties of Vinyl Chloride Resin Composition | | | | |
|---|---|---|---|---|---|
| | Strength & Elongation at High Temperature | | Transparency | | Roll Sticking Time (min.) |
| Polymer Processing Aid No. | Breaking Strength (kg/cm²) | Elongation at Breakage (%) | Tp (%) | H (%) | |
| Present Invention | | | | | |
| 9 | 7.13 | 185 | 83.0 | 3.9 | 6.0 |
| 10 | 7.20 | 186 | 83.0 | 3.9 | 11.0 |
| 11 | 7.17 | 191 | 82.9 | 4.1 | 12.3 |
| 12 | 7.01 | 183 | 83.1 | 3.8 | 14.1 |
| 13 | 7.09 | 179 | 82.7 | 4.2 | 11.0 |
| 14 | 7.01 | 181 | 83.1 | 4.2 | 13.2 |
| 15 | 7.21 | 180 | 82.3 | 4.0 | 10.3 |
| 16 | 7.31 | 177 | 81.9 | 4.9 | 11.1 |
| 17 | 7.15 | 181 | 83.6 | 4.0 | 11.2 |
| 18 | 7.26 | 176 | 82.4 | 4.1 | 11.6 |
| 19 | 7.15 | 183 | 83.1 | 3.8 | 12.0 |
| 20 | 7.15 | 180 | 82.9 | 4.0 | 11.6 |
| 21 | 6.98 | 176 | 81.8 | 4.8 | 10.1 |
| 22 | 7.25 | 186 | 82.7 | 4.1 | 6.0 |
| Comparsion Example | | | | | |
| None | 7.07 | 146 | 83.3 | 4.0 | 4.6 |

≠Tp : Parallel Ray Transmittance,
H : Haze

EXAMPLE 9

The copolymer (A) of each of Polymer Processing Aids Nos. 9, 10, 12, 13, 15, 16, 17, 20 and 22 was separately prepared by polymerization. The polymerization was conducted at 50° C. for 16 hours by using 300 parts of water, 1.0 part of sodium dodecylbenzenesulfonate, 0.08 part of potassium persulfate, and 0.02 part of sodium hydrogensulfite for a total of 100 parts of the monomers giving each copolymer (A). The glass transition temperature (Tg) of each copolymer thus obtained was measured on the basis of the variations in refractive index according to temperature change. The results obtained are shown in Table 7.

When a polymer processing aid comprising a copolymer (A) having a glass transition temperature (Tg) controlled not to exceed 50° C. was subjected to salting out under normal conditions, the corresponding polymer processing aid powder contained only a small amount (not exceeding 10%) of fine particles of a size of 40μ or less, and thus the subsequent treatments such as washing with water, filtration and drying were facilitated.

If a polymer processing aid comprising a copolymer (A) having a Tg of higher than 50° C. is subjected to salting out under normal conditions, a large amount (more than 15%) of fine polymer particles of a size of 40μ or less will be formed in the corresponding polymer processing aid powder, resulting in difficulty in the subsequent treatments in some cases.

Table 7

| Polymer Processing Aid No. Comprising Copolymer (A) | Glass Transition Temperature (Tg) |
|---|---|
| Present Invention | |
| 9 | 55° C. |
| 10 | 45° C. |
| 12 | 13° C. |
| 13 | 47° C. |
| 15 | 46° C. |
| 16 | 40° C. |
| 17 | 48° C. |
| 20 | 44° C. |
| 22 | 76° C. |

EXAMPLE 10

1.0 part each of Polymer Processing Aids Nos. 9, 10, 13, 15, 16, 17, 18, 20, and 22 was added to and blended with 90 parts of polyvinyl chloride (average degree of polymerization: 700), 10 parts of an impact modifier (BTA-IIIs, manufactured by Kureha Kagaku Kogyo Kabushiki Kaisha, Japan), 3.5 parts of a dibutyltin stabilizer, 1.5 parts of an organotin stabilizer and lubricant, 0.2 part of a liquid paraffin, and 0.1 part of stearic acid. The resulting compositions were formed into T-die sheets of respectively 0.1 mm and 0.3 mm thicknesses, and 30 cm width.

These T-die sheets were tested for the properties set forth in Table 8. The results obtained are shown in Table 9.

COMPARISON EXAMPLE 2

The tests set forth in Table 8 were conducted in exactly the same manner as in the preceding Example by using a commercially available polymer processing aid (1) predominantly comprising methyl methacrylate. The results are listed in Table 9.

As a further comparison example, a vinyl chloride resin composition comprising no polymer processing aid was similarly tested. The results are also listed in Table 9.

TABLE 8

Transparency

The parallel ray transmittance (Tp) and haze (H) of a T-die sheet of 0.3 mm thickness were measured by means of a hazeometer of integrating sphere type with C-filter in accordance with JIS K-6714.

Surface Gloss

The specular gloss (Gs) at an angle of 60° of a T-die sheet of 0.3 mm thickness was measured by means of a VG-IB-type variable-angle gloss-meter (mfd. by Nihon Denshoku Kogyo K.K., Japan).

Elongation at High Temperature

A specimen of JIS-No. 1 dumbbell shape was cut from a T-die sheet of 0.3 mm thickness in the extrusion direction, and the elongation of this specimen was measured by means of Tensilon UTM-L (mfd. by Toyo Sokki K.K., Japan).

Measurement Conditions

| | |
|---|---|
| Temperature | 150° C. |
| Sample length | 40 mm |
| Pulling rate | 500 mm/min. |

Ungelled Particles (Fish Eyes)

The number of ungelled particles in a T-die sheet of 0.1 mm thickness, 23 mm width, and 100 cm length was examined by the naked eye.

Table 9

| | Polymer Processing Aid No. | Properties of Vinyl Chloride Resin Composition | | | | |
|---|---|---|---|---|---|---|
| | | Transparency | | Surface Gloss (%) | Elongation at High Temp. (%) | Ungelled Particle (number) |
| | | Tp (%) | H(%) | | | |
| Present Invention | 9 | 87.8 | 3.2 | 152 | 141 | 37 |
| | 10 | 87.6 | 3.4 | 152 | 142 | 36 |
| | 13 | 88.1 | 3.0 | 151 | 143 | 35 |
| | 15 | 88.0 | 2.9 | 150 | 141 | 34 |
| | 16 | 87.8 | 3.1 | 153 | 151 | 38 |
| | 17 | 87.4 | 3.1 | 153 | 140 | 35 |
| | 18 | 87.4 | 3.0 | 152 | 146 | 36 |
| | 20 | 88.1 | 2.9 | 151 | 152 | 38 |
| | 22 | 87.8 | 3.0 | 153 | 143 | 36 |
| Comp. Examp. | 1 | 88.1 | 2.7 | 144 | 155 | 57 |
| | None | 88.3 | 2.8 | 144 | 100 | 32 |

EXAMPLE 11

Into a reactor provided with a stirrer were charged 1 g of dodecylbenzenesulfonate which had been dissolved in 300 g of distilled water, 0.04 g of potassium persulfate, 0.01 g of sodium hydrogensulfite, 90 g of methyl methacrylate, 10 g of dibutyl itaconate, and 0.03 g of n-dodecyl mercaptan. The atmosphere within the reactor was purged with nitrogen, and then the temperature in the reactor was raised to 50° C. with stirring. The mixture obtained was subjected to a reaction at this temperature for 15 hours. After cooling of the reaction mixture, the latex obtained was subjected to precipitation with aluminium sulfate, and subsequently neutralized, filtered, washed with water and dried, whereupon 99.0 g of a polymer (Polymer Processing Aid No. 23) having a reduced viscosity of 5.53 dl/g was obtained.

3 parts of this polymer was blended with polyvinyl chloride under the same conditions as in Example 1, and the resultant composition was tested for the transparency, surface smoothness, and strength and elongation at a high temperature set forth in Table 1. The results obtained are shown in Table 10.

EXAMPLE 12

Polymer Processing Aids (Nos. 24, 25 and 26) each having the composition and reduced viscosity shown in Table 10 were similarly tested as in Example 11, and the results listed in Table 10 were obtained.

Table 10

| Polymer Processing Aid No. | Polymer Processing Aid | | Properties of Composition | | | | |
|---|---|---|---|---|---|---|---|
| | | | Transparency | | | Strength & Elongation at High Temperature | |
| | Composition (Weight Ratio) | ηsp/c (dl/g) | Parallel Ray Transmittance (%) | Haze (%) | Surface Smoothness | Breaking strength (kg/cm²) | Elongation at Breakage (%) |
| Present Invention 23 | MMA/DBI = 90/10 | 5.53 | 81.5 | 4.7 | A | 7.3 | 200 |
| 24 | " = 60/40 | 12.83 | 71.7 | 8.1 | A | 6.9 | 177 |
| 25 | " = 50/50 | 7.34 | 70.2 | 8.3 | A | 6.8 | 165 |
| 26 | MMA/DEI = 90/10 | 5.31 | 80.0 | 7.0 | A | 7.3 | 190 |

As apparent from the Examples, a feature of the composition according to the present invention in addition to its features of high gelation rate and increased elongation at a high temperature, which are also attained by a composition comprising a vinyl chloride polymer and an ordinary high polymer processing aid, is that a product formed from the composition contains an extremely small number of ungelled particles (fish eyes), and possesses a remarkably smooth surface.

For example, as to ungelled particles, only a very few ungelled particles are observed in the composition of this invention, similarly as in a vinyl chloride polymer with which no polymer processing aid has been mixed, even when the number of ungelled particles is examined under such severe conditions as those of extrusion of the composition through a 20 mm$\phi$-extruder to form a T-die sheet of 25 mm width and 0.5 mm thickness and then stretching of the sheet with a stretching ratio of about 13 to form a sheet of 10 mm width and 0.1 mm thickness for use in the examination. In contrast, a large number of ungelled particles are observed in a composition comprising a prior art polymer processing aid and a vinyl chloride polymer when the composition is similarly tested and examined.

As to the surface smoothness of a formed product, the surface of a product formed from the composition of this invention is so smooth that neither concavities nor convexities can be observed thereon when the surface is magnified 40 times, or even as much as 100 times, with an optical microscope. In contrast, a considerable number of concavities and convexities are observed on the surface of a product formed from a composition comprising a prior art polymer processing aid and a vinyl chloride polymer when the surface is magnified only 40 times with an optical microscope. Heretofore, it was difficult to provide a formed polymer product having surface smoothness and at the same time to reduce the number of ungelled particles therein, but these two requirements can be satisfied at the same time in accordance with the present invention.

Furthermore, the composition of this invention, while retaining excellent properties inherent in the vinyl chloride polymer, possesses remarkable processability for any type of processing which is applicable to vinyl chloride polymers such as extrusion, calendering, blow molding or injection molding, and a formed product obtained therefrom has an eminently improved finish, for example, as follows.

(1) In calendering, since improved knitting performance can be attained during roll kneading and the gelation rate of the polymer is accelerated with the result that the resin is uniformly kneaded, a sheet having excellent surface properties can be obtained. Further, the elongation at breakage of a resin film which is desired during processing is increased and thus the film can be easily stretched, whereby an exceedingly thin film can be formed.

(2) In blow molding, the parison drawdown, uniformity and surface roughness of a formed product are notably improved.

(3) In pipe extrusion and contour extrusion, since the gelation rate is accelerated and the resin is uniformly kneaded, a product having improved surface gloss and mechanical properties can be obtained.

(4) In injection molding, drawbacks such as jetting and gate flashes which have often occurred in the vicinity of the gate of moldings in the past are eliminated, so that moldings having surface gloss can be obtained.

(5) In T-die extrusion, the surface gloss of extrudates is remarkably improved, and no processing trouble such as flow marks occurs. Further, since the elongation at breakage of a resin sheet which is desired during processing is greatly increased, a very thin film of a uniform thickness can be easily obtained by extrusion and stretching.

(6) In vacuum forming, the tensile strength and elongation at breakage under heating at a high temperature are increased, and thus flagging of a resin sheet during heating can be prevented, whereby deep drawing can be easily applied, and even formed products of large size or complicated surface profiles can be obtained. In particular, the formed products obtained have remarkably improved surface properties.

What is claimed is:

1. A vinyl chloride resin composition with surface smoothness comprising:
   (1) 100 parts of a vinyl chloride polymer; and
   (2) 0.1 to 30 parts of a polymer processing aid comprising:
      (A) 10 to 100 parts of a copolymer comprising 20 to 99% of an alkyl methacrylate, 1 to 70% of a dialkyl itaconate, and 0 to 60% of a monomer copolymerizable therewith; and
      (B) 0 to 90 parts of a copolymer comprising 80 to 100% of an alkyl methacrylate, and 0 to 20% of a monomer copolymerizable therewith, the sum of the quantities of the copolymers (A) and (B) producing 100 parts of the polymer processing aid, all quantities expressed in parts and percentages being by weight.

2. A vinyl chloride resin composition as claimed in claim 1, wherein the polymer processing aid is obtained by polymerizing 10 to 90 parts by weight of the constituent monomers of the copolymer (A) in the presence of 90 to 10 parts by weight of the copolymer (B).

3. A vinyl chloride resin composition as claimed in claim 1, wherein the polymer processing aid is obtained by polymerizing 90 to 10 parts by weight of the constituent monomers of the copolymer (B) in the presence of 10 to 90 parts by weight of the copolymer (A).

4. A vinyl chloride resin composition as claimed in claim 1, wherein the polymer processing aid is obtained by polymer-blending the copolymers (A) and (B) in latex form.

5. A vinyl chloride resin composition as claimed in claim 1, wherein the dialkyl itaconate constitutes 10 to 60% by weight of the copolymer (A).

6. A vinyl chloride resin composition as claimed in claim 1, wherein the alkyl methacrylate is methyl methacrylate.

7. A vinyl chloride resin composition as claimed in claim 1, wherein the dialkyl itaconate is selected from the group consisting of diethyl itaconate and dibutyl itaconate.

8. A vinyl chloride resin composition as claimed in claim 1, wherein the monomer copolymerizable with the alkyl methacrylate and dialkyl itaconate in the copolymer (A) is an alkyl acrylate, which monomer constitutes 20 to 60% by weight of the copolymer (A).

* * * * *